(12) United States Patent
Herschman et al.

(10) Patent No.: US 10,389,990 B2
(45) Date of Patent: Aug. 20, 2019

(54) SYSTEMS AND METHODS FOR RECORDING, PROCESSING, AND PLAYBACK OF BIO-MEDIA DATA

(71) Applicant: CHILLS, LLC, Las Vegas, NV (US)

(72) Inventors: Chase Herschman, Las Vegas, NV (US); Adam Herschman, Los Angeles, CA (US); Bonn Lahouti, Springdale, AR (US)

(73) Assignee: CHILLS, LLC, Las Vegas, NV (US)

( * ) Notice: Subject to any disclaimer, the term of this patent is extended or adjusted under 35 U.S.C. 154(b) by 14 days.

(21) Appl. No.: 15/867,253

(22) Filed: Jan. 10, 2018

(65) Prior Publication Data

US 2018/0199021 A1   Jul. 12, 2018

Related U.S. Application Data

(60) Provisional application No. 62/444,658, filed on Jan. 10, 2017.

(51) Int. Cl.

| | |
|---|---|
| *H04N 9/80* | (2006.01) |
| *H04N 9/87* | (2006.01) |
| *H04N 21/43* | (2011.01) |
| *H04N 21/435* | (2011.01) |
| *H04N 5/765* | (2006.01) |
| *H04N 9/82* | (2006.01) |
| *H04N 21/41* | (2011.01) |
| *H04N 21/422* | (2011.01) |
| *H04N 21/81* | (2011.01) |
| *H04N 5/77* | (2006.01) |

(52) U.S. Cl.
CPC .......... *H04N 9/8715* (2013.01); *H04N 5/765* (2013.01); *H04N 9/8205* (2013.01); *H04N 21/4104* (2013.01); *H04N 21/42201* (2013.01); *H04N 21/435* (2013.01); *H04N 21/4307* (2013.01); *H04N 21/8133* (2013.01)

(58) Field of Classification Search
USPC ......................................... 386/223–228, 248
See application file for complete search history.

(56) References Cited

U.S. PATENT DOCUMENTS

| | | | |
|---|---|---|---|
| 10,210,475 B2* | 2/2019 | Pargoe | G06Q 10/0836 |
| 10,237,822 B2* | 3/2019 | Hanchett | H04W 4/80 |
| 2009/0023422 A1* | 1/2009 | MacInnis | G06F 17/30598 |
| | | | 455/411 |

(Continued)

*Primary Examiner* — Nigar Chowdhury
(74) *Attorney, Agent, or Firm* — Pejman Yedidsion; Brooks Acordia IP Law, PC

(57) ABSTRACT

Systems, devices, and methods for recording, processing, and playback of bio-media data include a processor and addressable memory, a video interface, an audio interface, at least one bio-feedback interface, and bio-media playback application that may direct the processor to acquire a bio-media file. In some embodiments, the system may translate the biometric data to bio-feedback interface data using the bio-media file, video interface data, audio interface data, and biometric data. The system may determine bio-media data via an integration of the bio-feedback interface data with at least one of the video interface data, and the audio interface data, initiate playback of the integrated bio-media data, and operate the bio-feedback device based on the integrated bio-media data.

20 Claims, 11 Drawing Sheets

(56) References Cited

U.S. PATENT DOCUMENTS

2013/0080348 A1\* 3/2013 Pantaliano ............. G06Q 30/02
 705/347
2014/0019157 A1\* 1/2014 Nudd ..................... G16H 40/20
 705/2

\* cited by examiner

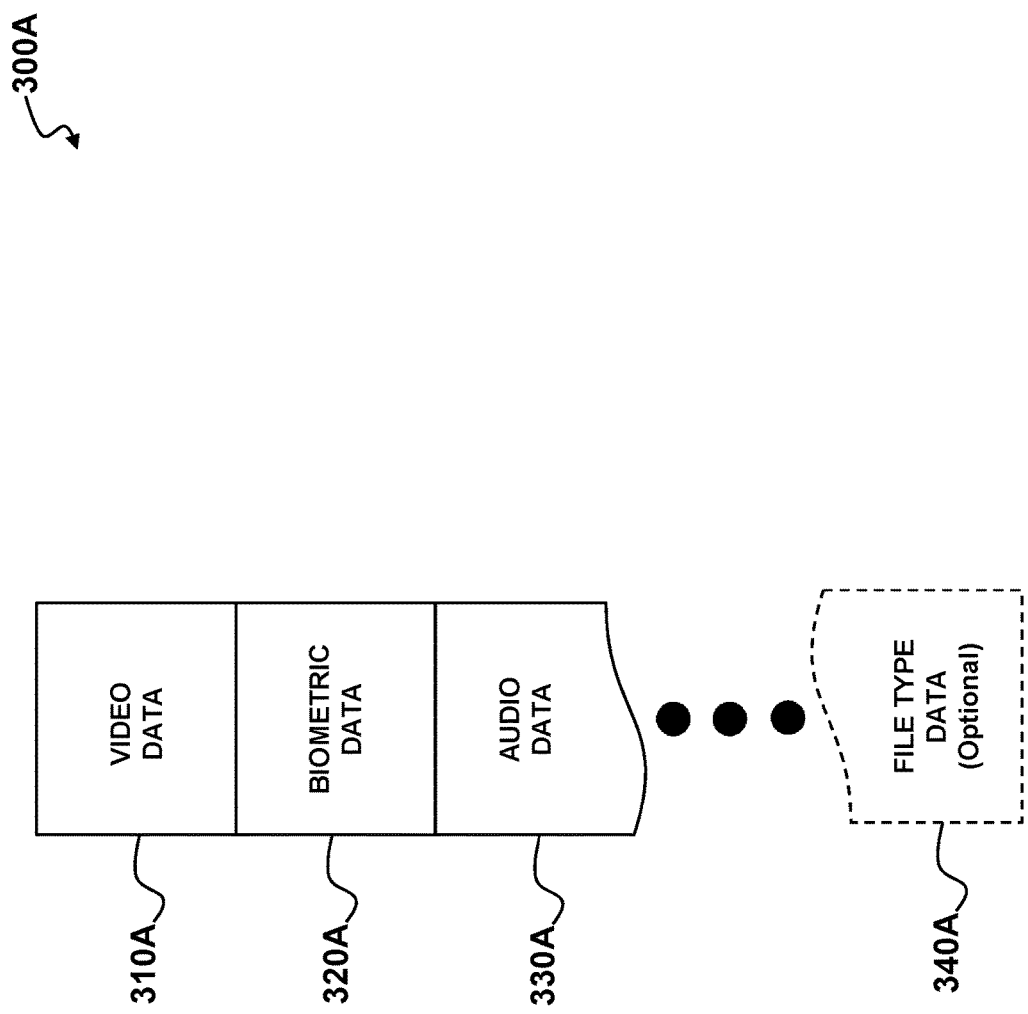

SYSTEMS AND METHODS FOR RECORDING, PROCESSING, AND PLAYBACK OF BIO-MEDIA DATA

CROSS-REFERENCE TO RELATED APPLICATIONS

This application claims priority to and the benefit of Provisional Patent Application No. 62/444,658 filed Jan. 10, 2017, the contents of which is hereby incorporated by reference herein in its entirety and for all purposes.

BACKGROUND

Biometrics may refer to measurable physical characteristics where those characteristics may be automatically recorded or checked. There are several types of identifiable biometric data schemes, for example, facial: the analysis of facial characteristics; fingerprint: the analysis of an individual's unique fingerprints; heart rate monitoring: the analysis of heart rate in real time or record the heart rate for later study. Additionally, biometric data may be a general term used to refer to any digital data that is created during a biometric process. This includes samples, models, fingerprints, similarity scores and all verification or identification data. According to recent advancements, biometrics based on brain (electroencephalogram) and heart (electrocardiogram) signals have emerged. Additionally, wearable technology, defined as electronics that may be worn on the body—either as an accessory or as part of material used in clothing—has also emerged as a means for collecting such biometric data. One of the major features of wearable technology is its ability to connect to the Internet, enabling data to be exchanged between a network and the device.

SUMMARY

In a number of embodiments, a bio-media playback device includes a processor and addressable memory, a video interface, an audio interface, at least one bio-feedback interface, the memory, a bio-media playback application that directs the processor to acquire a bio-media file, the bio-media file video interface data, audio interface data, and biometric data, which translate the biometric data to bio-feedback interface data, determine bio-media data via an integration of the bio-feedback interface data with at least one of the video interface data, and the audio interface data, initiate playback of the integrated bio-media data, and operate the bio-feedback device based on the integrated bio-media data.

In a further embodiment, the bio-media playback application also directs the processor to integrate the at least one-bio-feedback interface data with the video interface data and the audio interface data.

In another embodiment, the integration process synchronizes the bio-feedback interface data with at least one of: the video interface data, and the audio interface data.

In a still further embodiment, the integration process is via using metadata stored within the bio-media file.

In still another embodiment, the bio-media playback application also directs the processor to acquire the bio-media file from a remote server.

In a yet further embodiment, the playback of the bio-media file is achieved in real-time.

In a further embodiment again, the bio-media playback application also directs the processor to acquire the bio-media file as a data stream from a broadcast provider.

In another embodiment again, the data stream is a bio-media file with bio-feedback interface data representing a combined biometric value determined from at least two bio-media files.

In a further additional embodiment, the acquired bio-media file comprises a video interface data, an audio interface data, and a referential pointer data to bio-feedback interface data, the bio-feedback interface data is stored external to the bio-media file.

In another additional embodiment, the referential pointer data to bio-feedback interface data references bio-feedback interface data stored on a remote server.

In a still yet further embodiment, a method for playback of bio-media files comprises acquiring a bio-media file, the bio-media file video interface data, audio interface data, and biometric data, translating the biometric data to bio-feedback interface data, determining bio-media data via an integration of the bio-feedback interface data with at least one of the video interface data, and the audio interface data, initiating playback of the integrated bio-media data, and operating the bio-feedback device based on the integrated bio-media data.

In a still further embodiment, the method includes integrating the at least one-bio-feedback interface data with the video interface data and the audio interface data.

In a still yet further embodiment again, the integration synchronizes the bio-feedback interface data with at least one of the video interface data, and the audio interface data.

In a still further additional embodiment, the integration is via using metadata stored within the bio-media file.

In still another additional embodiment, the process also acquires the bio-media file from a remote server.

In a yet further embodiment again, playback of the bio-media file is achieved in real-time.

In yet another embodiment again, the process also acquiring the bio-media file as a data stream from a broadcast provider.

In a yet further additional embodiment, the data stream is a bio-media file with bio-feedback interface data representing a combined biometric value determined from at least two bio-media files.

In a further additional embodiment again, the acquired bio-media file includes a video interface data, an audio interface data, and a referential pointer data to bio-feedback interface data, the bio-feedback interface data is stored external to the bio-media file.

In many embodiments, the referential pointer data to bio-feedback interface data references bio-feedback interface data stored on a remote server.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF DRAWINGS

Embodiments are illustrated by way of example and not limitation in the figures of the accompanying drawings, which may not be drawn to scale, and in which:

FIG. 3A conceptually illustrates a top level functional block diagram of a self-contained bio-media file structure in accordance with an embodiment of the invention;

DETAILED DESCRIPTION

Figure 1:
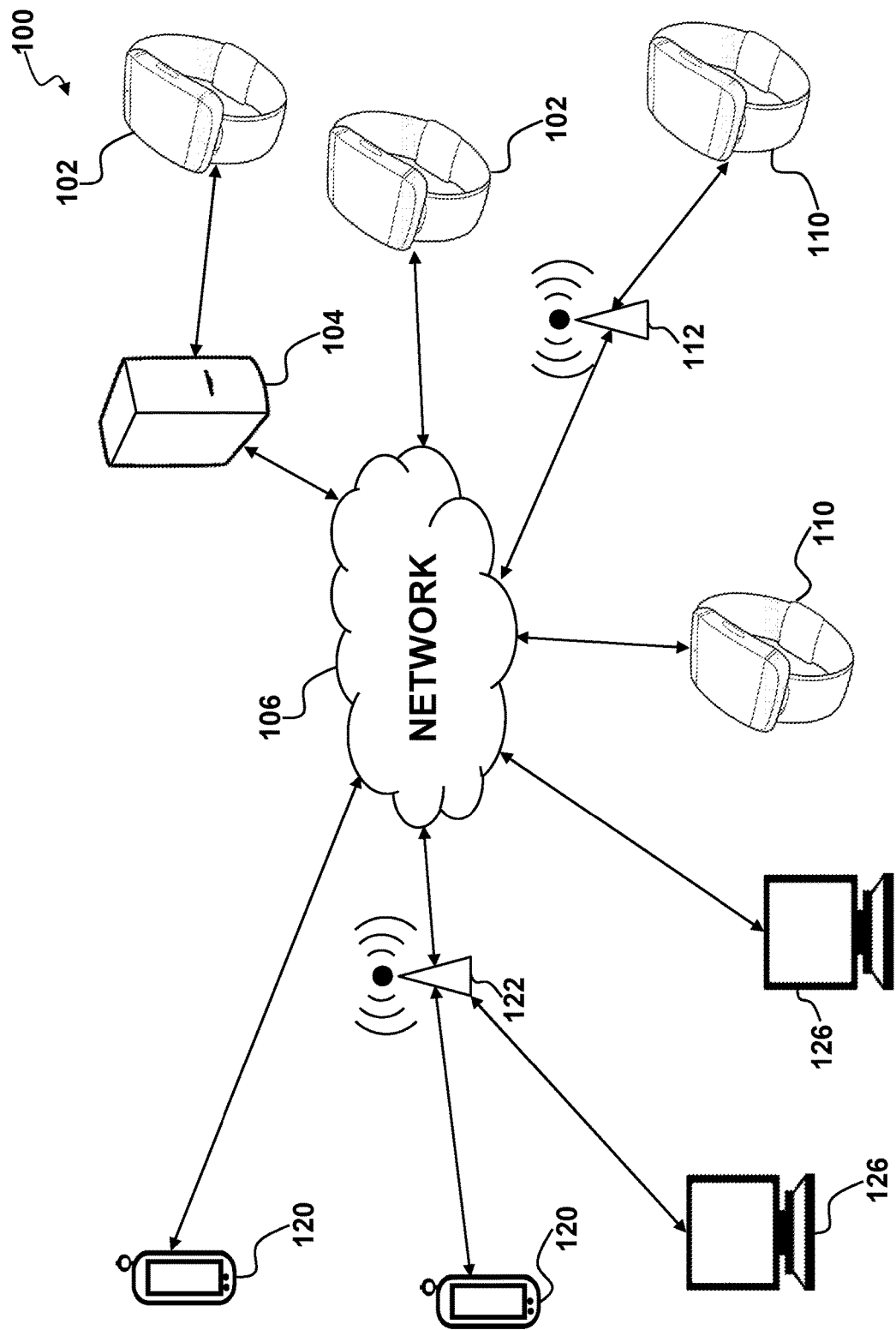
FIG. 1 depicts a network diagram of a bio-media recording and playback system in accordance with an embodiment of the invention.

The current application discloses the basis for a wearable device, for example, asmartwatch, that may have a built-in continuous heart rate monitor and optionally an activity tracker. With the utilization of optical sensors, the device comprising built-in microprocessors, may analyze and measure heart rate using infrared light technology. Accordingly, by integrating optical sensors incorporated with smart wearables, heart rate monitoring may be achieved. In one example of a wearable device, heart rate monitoring is via a plurality of sensors to detect a human pulse. These sensors may be embedded into the device which enables the device to track vitals such as heart rate, activity, temperature, and optionally measure blood oxygen levels. The sensors may include infrared and visible-light LEDS in addition to photosensors, which all work together to detect heart rate. One example of the wearable device may comprise a microprocessor, which is continuously monitoring the electrical activity of the heart over a period of time and calculating the heart rate and other parameters; the wearable device may also include GPS-enabled chips and accelerometers to detect speed and distance, while recording a person's heartbeat.

Some embodiments of a bio-media integration computing system may comprise a wearable device, e.g., a smartwatch, a networked computing device, e.g., a server, and a destination computing device, e.g., a mobile device. In one embodiment of the bio-media integration computing system, media is synchronized with biometric data, where the integration and synchronization steps may be done at the wearable device, networked computing device, or destination computing device. For example, Photos, Videos, Music, Audio, Text, GPS, Gyro, Compass, Accelerometer, Live video, Live calling, may be synchronized with biometric data. That is, heart rates, oxygen levels, glucose levels, etc., comprising biometric data, may be gathered from a wearable device where the wearable device may have access to the internet. The aforementioned data may therefore be transmitted to the networked computing device, comprising a processor and memory, for processing where the device enables users to attach biometric data stream and experience to photos, videos, and music. Accordingly, one user may be able to then send the synchronized media with biometric data to another user, who will feel it played out for them in vibrations. This may be done in real-time or the device may keep real time stats and integrate the media with biometric data at a later time.

The bio-media integration computing system may implement biometric tracking and biometric live streaming via a processor executing instructions on the processor of a wearable device, a mobile device, and/or a networked computing device. Accordingly, by the system associating multi-media data with biometric data, a user may be able to stamp a picture, audio, video, etc. with biometric data. In one embodiment of the bio-media integration computing system, a scheme similar to slip-streaming in computing where one set of data is included back into an original data file by integrating additional data back into a previously recorded or original content. That is, a resulting file, comprising both portions of data, is comprised of biometric data inserted into, for example, a video file, resulting into a new file data format, i.e., bio-media data. One application of this may be where a mobile application running on a mobile device, effects live broadcast of a person's heartbeat and allow posting of comments, pictures, videos and audio while the broadcast is being made. Additionally, the broadcast—comprising the bio-media data—may be recorded and made available for viewing later. The resulting file may be a media file that also has biometric data slip-streamed into the files and live-streams, thereby enabling media files to carry biometric data.

In one embodiment of the bio-media integration computing system, users may live broadcast their biometric data, specifically the heart rate over the Internet via a live stream. The broadcast may be a one to one (1-to-1) or one-to-many type that is capable of privately or publicly broadcasting. The system may enable anyone to broadcast their heartbeat publicly or privately to listeners listening in or viewing, with minimal delay, i.e., 'tick by tick.' In an alternative embodiment, as opposed to a live stream, the system may record the audio, video, pictures and biometric data, save the data for a specified time period, and broadcast the integrated biometric and media data as a filtered file format. Accordingly, a user may live broadcast their heartbeats and post comments, pictures, videos, and audio while broadcasting and/or the broadcasts may be recorded and available for viewing later.

The present application discloses methods, devices, and systems for allowing a user to broadcast biometric specific data, for example, heart rate, along with other media content type data; and more particularly, to methods and devices for dynamically integrating related biometric data associated with certain media content. That is, the systems, methods, and devices may determine a resulting file or combined data, necessary for integrating such information and then transmitting that information to other users to help them experience, for example, the same heart rate as the broadcasting user may be experiencing or may have experienced. In accordance with the embodiments of this application, the bio-media integration computing system integrates, via a synchronization scheme, the collected biometric data from a broadcasting user with a set of media content from the broadcasting user, while utilizing a compression scheme—encoder/decoder—to create bio-media formatted content data. The receiving user may experience the heartbeat via, for example, the vibration ability of the cell phone vibrating the device at every beat and in the same pulse strength as the recorded heartbeat.

An example wearable device, optionally GPS-enabled, having capabilities of a built-in heart rate monitor for the broadcasting user to track heart rate, may compress the data (using any conversion formatting necessary for encoding information using fewer bits than the original representation) before transmission or alternatively, send the raw data to another device, for example, a smartphone, to perform the compression. Once an encoder has processed the data, it may then go through steps of a format conversion/aspect ratio conversion before transmission. The integration of the biometric data with the media content data may also be performed by a processor or an encoder where the data is slip-streamed together, for example, one set of bytes may be inserted after another while the same file or a separate file may comprise the associated synchronization data information. That is, the data may be reconstructed at the decoder so that the media content data may be displayed while the biometric data is replicated on the receiving device.

Embodiments of the bio-media integration computing system may be used for providing live human vital broadcasting services, for example, one purpose of which may be connecting users across multiple devices. As way of an example and not a limitation, the system may perform this by combining:

(1) Biometric data—indicates how a user's body and mind are reacting to an event—through collected information by sensors—should they decide to transmit such information to another user;

(2) Media Content Data—photos, videos, audio, etc., where the media content data is (a) live broadcasted or (b) stored for future broadcast, and is directly associated with the biometric data, particularly as to timing and location; and (3) Determining and Transmission of the integrated bio-media data—the information collected from sensors and other means may be slip-streamed together and then transmitted—either via LTE, Wi-Fi, or Bluetooth technology—to another user. A secured storage location may be used where all of the data may be combined and a unified file may be transmitted to the other user via similar means, or an application notification, e.g., push notification.

Bio-Media Use Cases

In one embodiment of the bio-media integration computing system, the system may allow Physicians who may not be physically present and/or currently follow their patients, to monitor the patient who may be live streaming their heartbeat from outside the medical facility, rather than be in the form of historic reports. That is, an individual may be able to quickly communicate their emergency to persons interested such as nurses, caregivers, children, parents, friends and family, etc. Additionally, caregivers or family members, via the bio-media integration computing system, may monitor and receive live notifications based on their configuration. This is done via allowing the caregiver or family member, i.e., monitoring parties, to receive media (e.g., photos, videos, audio, etc.) while receiving biometric data (e.g., heartbeat). Thereby, the monitoring party may call and stream data (GPS, biometric data, photos, audio, etc.) to 911 or call on the broadcaster's behalf. Alternatively, the monitoring party may trigger a 3-way call (with 911) based on the received bio-media data information.

Embodiments may be implemented as an application running on a mobile device, e.g., smartphone, or be implemented as a web based service. Embodiments of bio-media integration computing system may be disclosed by example, as devices, systems, and methods, and may be embodied as an application running on one or more processors, e.g., an Apple®, Google® Android, and/or Windows® phone application running on a smartphone and/or one or more remote servers and/or computers. That is, a scheme for integrating biometric data with media content data and transmitting the integrated data, may be implemented where two users are identified, one as a broadcaster and one as a streamer. Accordingly, the devices for both parties are capable of executing the installed applications in order to share the bio-media data.

In one aspect of the embodiments, the objective of the application is to provide caregivers a way to monitor loved ones, be notified based on customized notification configurations including GPS, Heart rate, Audio, Video, and Pictures, and quickly notify emergency services in the event something is wrong. In this embodiment, the person being monitored (broadcaster) has an application on their phone that interacts with a wearable device that tracks their biometrics, records audio and video for the monitoring party to stream live or review. The monitoring party (streamer) streaming the media and biometrics may also use the app to contact the broadcaster directly either via the app VOIP, VIDEO, traditional telephone call or emergency services. The monitoring party may live stream audio, video, location (GPS) and bio metric data such as heart rate, live using the app and website. They may also, go back in time and review content and data for investigational purposes. The monitoring party may initiate emergency phone calls for the broadcasting party remotely using the application in the event they are incapable or unable to do it themselves. Additionally, the monitoring party may enable live streaming of the broadcasting party's camera, microphone, biometrics, location, vibration, ringer etc. to be viewed on the app and website in real-time or near real-time. In this example, a streamer may be alerted when the heart rate of a broadcaster goes above or below a certain BPM, or when they stop broadcasting altogether, indicating something has gone wrong.

In one embodiment, the data communication between the devices may be via, for example, a User Datagram Protocol (UDP) which is a transport layer protocol defined for use with the IP network layer protocol. In one aspect of the present embodiment, a push data mechanism may be implemented via TCP/IP protocols and the line tracking time updates may be sent in real-time. Each mobile device may comprise an embedded web application server that may allow executable applications or scripts, e.g., application software, that may be available in versions for different platforms and are to be executed on the mobile device. Applications may be developed to support various mobile devices and their respective operating systems such as: iOS, Android, and Windows.

The system and method embodiments may provide a computing device, having a processor and memory, for receiving the information transmitted by the wearable device for processing and communicating to the mobile devices of the other users, i.e., receiving or streaming user. The method may include receiving a set of sensor readings associated with each human vital at a particular time and location and then optionally storing the information in a data store for the associated user. In the embodiment utilizing storage of data, the information may then be made available based on a set of requests. The system may then associate a user with a specified data file, where the data file may include the biometric data and the media content data. The integration of the biometric data and media content data may be performed by any of the computing devices having a processor and memory, for example, at the wearable device, at the mobile device, or at a server computing device. Once the integration of the data is completed by the appropriate device, the server computing device, e.g., a processor and resource for storing information, may determine the user devices to which the integrated data may be transmitted to. A synchronous computing, asynchronous computing, or combinations thereof, may use the corresponding information to retrieve and decode the integrated data file for each receiving/streaming user. In some embodiments, a secondary process may be created to monitor, in real-time, the data integrity of the integrated data file and update it according to any changes to the data traffic and/or upload/download speed. Accordingly, the bio-media data of the user, i.e., synchronized biometric data with media content, may be updated and streamed in real-time allowing the receiving user or users to share in the experience of the broadcasting user.

The embodiment may comprise a recipient device comprising an operating system and a data store having the ability to convey the bio-media data via either display or vibration, a sensor device comprising an operating system and an optional data store, and a computing server device comprising an operating system and a data store. The system effects the streaming of the bio-media data, based on either a request received from a user of the recipient device or a push command from the sensor device. The devices may comprise an application program running on the operating system to process encoding/decoding and streaming of bio-media data that may have been previously integrated and synchronized. That is, the sensor device may transmit the media content data along with a set of associated biometric data to the recipient device which will then be able to display/simulate the biometric data in synchronization with the media content.

The sensor device may transmit the associated information to the recipient device via the computing server device and via, for example, wireless WiFi®, wireless local area network (WLAN), or other wireless networks with broadcast methods such as Long Term Evolution (LTE), Bluetooth, and/or any other hardware or software radio broadcast methods, such as NFC or infrared. The computing server device may connect and work with any such devices that may use LTE or WLAN, for example, mobile phones, specifically smartphones, personal computers, tablets, televisions, and/or digital cameras, to connect to a network resource such as the Internet via wired or wireless communication.

The computing device, or server, that is configured to execute these steps use a link processing component that links the received biometric data from the sensor and the media content data—that may have been acquired by a data acquiring component—with each other. If the relevant information data is not present, the link processing component may query a separate component, for example, a data acquiring component, to acquire the corresponding data and store it in a storage component so as to determine the desired integrated bio-media data. Some embodiments may support the two steps as the biometric data and the media content data, that when integrated together may yield a file format which provides a way that information is encoded for storage in a computer file. The bio-media type file format may specify how bits are used to encode information in a digital storage medium and may be either proprietary or free and may be either unpublished or open. The bio-media file format, however, may be designed for storage of several different types of data, for example, a container for different types of multimedia, including any combination of audio and video, with or without text (such as subtitles), and metadata integrated with the biometric data. The biometric data file format may encode data using a specific algorithm, for example, using compression.

Bio-Media System

A system for recording and playback 100 of bio-media files in accordance with an embodiment of the invention is illustrated in FIG. 1. The bio-media recording and playback system 100 comprises a bio-media recorder 102 that may be connected to a network 106. In some embodiments, there may be more than one bio-media recorder 102, which may be connected to a remote server 104 that is itself connected to the network 106. In some embodiments, the remote servers 104 may be administered by a third party. In some aspects of the present embodiments, the bio-media recording and playback system 100 may comprise bio-media players 110 connected to the network 106. Additionally, some embodiments may have bio-media players 110 connected to a wireless network access point 112, which is itself connected to the network 106. Additionally, bio-media players may access the remote servers 102 through a variety of means. In a number of embodiments, a user may connect to the network 106 through mobile computing devices 120 or desktop computers 126 that may have specialized bio-media playback applications. These mobile computing devices 120 and desktop computers 126 may be connected directly to the network 106 or through a wireless network access point 122 which is itself connected to the network 106.

While a variety of bio-media recording and playback systems are described above with reference to FIG. 1, the specific components utilized within a bio-media recording and playback system and the manner in which the connections between the remote server, bio-media recorders, and bio-media players are largely dependent upon the requirements of specific applications. For example, in some embodiments, bio-media recorders and bio-media players may be connected via a direct connection, including, but not limited to, hard-wired connections, Bluetooth or infrared (IR) signals instead of through a network. Those skilled in the art will appreciate the numerous methods of communicating over networks including the Internet, which may be accessed through cellular networks, local area networks, or satellite services. Disclosed devices for recording bio-media files are discussed below.

Bio-Media Recording Devices

Figure 2A:
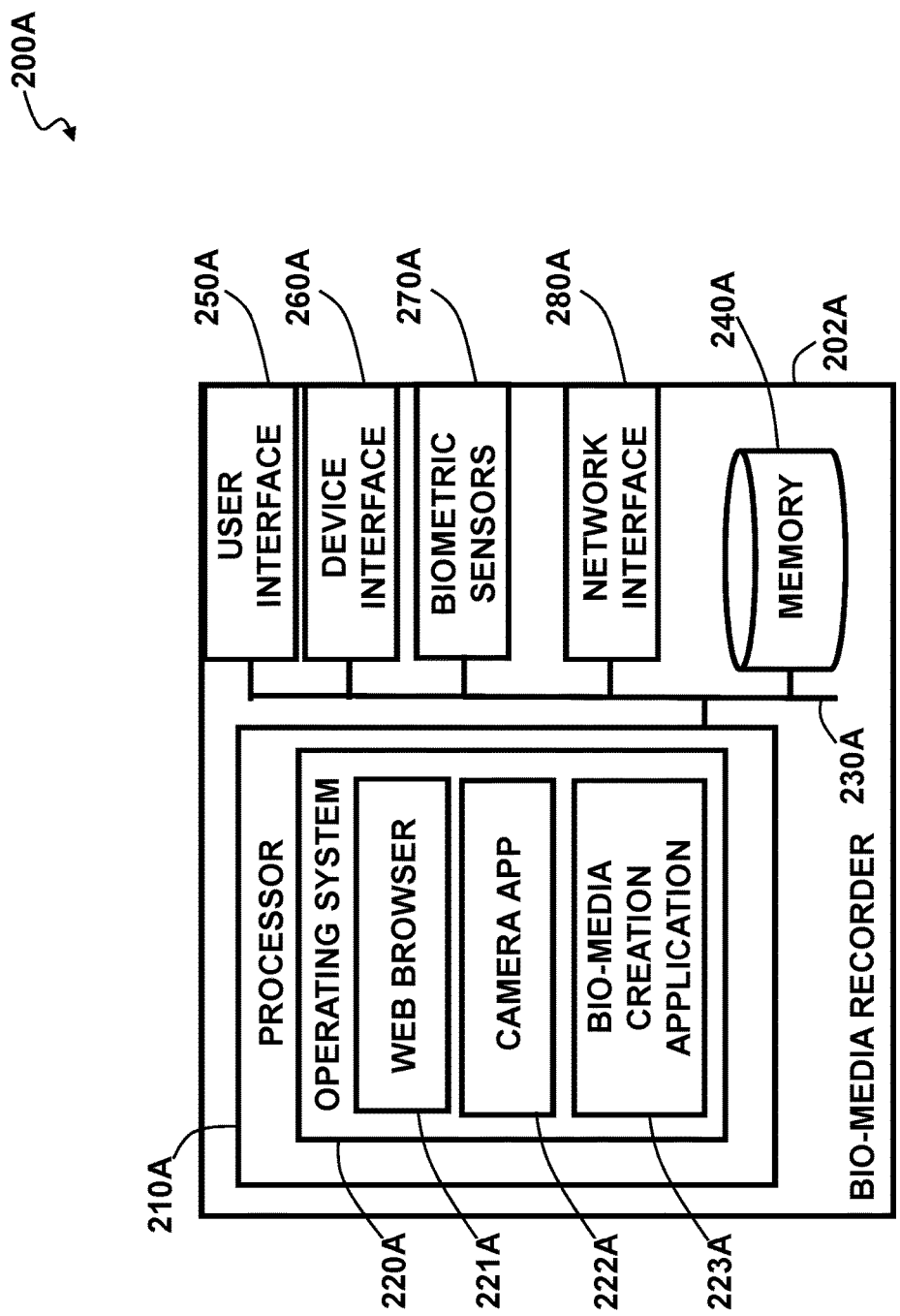
FIG. 2A conceptually illustrates a top level functional block diagram of a bio-media recorder in accordance with an embodiment of the invention.

A device for recording of bio-media data, and in some embodiment files, in accordance with an embodiment of the invention is illustrated in FIG. 2A. In some aspects of the present embodiments, the bio-media recorder 200A comprises a device 202A that may comprise a processor 210A and a memory 240A connected via a communication bus 230A. In a number of embodiments, the memory 240A may be in direct communication with the processor to run an operating system 220A which may then initiate other applications such as a web browser 221A, camera application 222A, and a bio-media creation application 223A. In further embodiments, the processor 210A and applications (221A, 222A, and 223A) may communicate via the communication bus 230A to a user interface 250A, device interface 260A, biometric sensors 270A, and/or the network interface 280A. Biometric sensors may include, but are not limited to, a heart-rate monitor, a blood-glucose meter, pedometer, blood oxygen meter, body temperature thermometer, respiratory sensor, tremor sensor, and/or a skin-conductivity meter. Those skilled in the art will recognize that there are numerous methods of capturing data relating to the human body as biometric data and biometric sensors of all types may be utilized based on the applications desired. In certain embodiments, it may be necessary to encrypt the stored biometric data as a personal health record (PHI) through the use of software or a specialized hardware process.

Figure 2B:
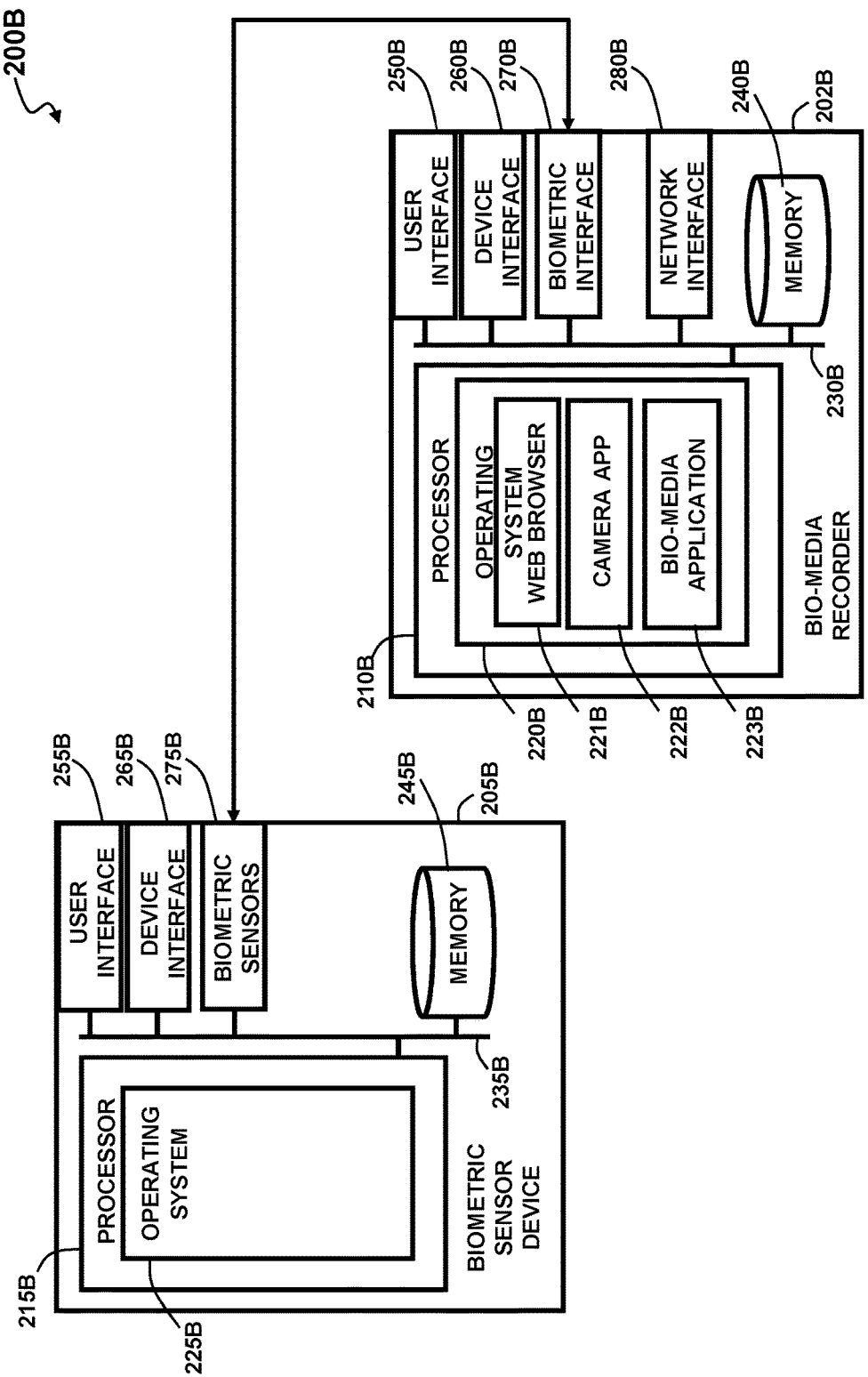
FIG. 2B conceptually illustrates a top level functional block diagram of a bio-media recorder connected to a biometric sensor device in accordance with an embodiment of the invention.

Another embodiment of a bio-media recording device in accordance with the present embodiments is illustrated in FIG. 2B. Similar to the bio-media recording device of FIG. 2A, the bio-media recording system 200B may contain in some aspects of the present embodiments, a bio-media recorder device 202B that comprises a processor 210B and a memory 240B connected via a communication bus 230B. In still further embodiments, the memory 240B may direct the processor to run an operating system 220B which may then initiate other applications such as a web browser 221B, camera application 222B, and a bio-media creation application 223B. In numerous embodiments, the processor 210B and applications (221B, 222B, and 223B) may communicate via the communication bus 230B to a user interface 250B, device interface 260B, biometric interface 270B, and network interface 280B. In some embodiments, the biometric interface 270B may be in communication with another biometric sensor device 205B that may itself comprising a processor 215B and memory 245B connected via a communications bus 235B. In yet further embodiments, the biometric sensor device 205B may have a separate operating system 225B connected to a user interface 255B, device interface 265B, and biometric sensors 275B. In some aspects of the present embodiments, the biometric sensors 275B may be in communication with the bio-media recorder 202B through a variety of interfaces including, but not limited to, a biometric interface 270B designed to receive biometric input.

While a variety of bio-media recording devices are described above with reference to FIGS. 2A-B, the specific components utilized within a bio-media recording device and the manner in which the bio-media files are recorded are largely dependent upon the requirements of specific applications. For example, in some embodiments, an external biometric sensor device may not require an operating system, or memory. Those skilled in the art will recognize that biometric sensor devices may come in a variety of configurations. In some embodiments, there may be numerous biometric sensors that feed into a single bio-media recorder device. File structures for bio-media files are discussed below.

Bio-Media File Structure

A bio-media file type structure in accordance with an embodiment of the invention is illustrated in FIG. 3A. The bio-media file 300A may comprise of varying sub-types of data. This data may be categorized as audio video (A/V) data, specifically video data 310A and audio data 330A, along with biometric data 320A. In some embodiments, the file structure may allow for additional types of file type data 340A to be stored within the file. This type of data may include, but is not limited to, metadata, location data, and file container data. In some aspects of the present embodiments the size of the file structure is only limited by the operating system file structure limits. In additional embodiments, the biometric data 320A is stored sequentially with the other data (310A, 330A, 340A), meaning that the biometric data is stored in logical proximity. In certain additional embodiments, the biometric data is interwoven with the video 310A and audio 330A data at the bit-level to facilitate enhanced playback abilities. For example, a bio-media file may have biometric data at the bit-level interwoven with the A/V data where each bit may represent either file type and/or a representation of the packet sizes for each that needs to be synchronized together. In numerous embodiments, the biometric data may be acquired from or added to an electronic health record (EHR) as a personal health information (PHI) record. In still additional embodiments, the bio-media system may store the biometric data of the bio-media file in an encrypted format or encode the entire bio-media file on an encrypted disk or agent system. Those skilled in the art will recognize that the encryption format can be symmetric or asymmetric in nature and can utilize any one of a number of methods to comply with federal and/or state laws including, but not limited to, triple DES, RSA, Blowfish, Twofish, and/or AES.

Figure 3B:
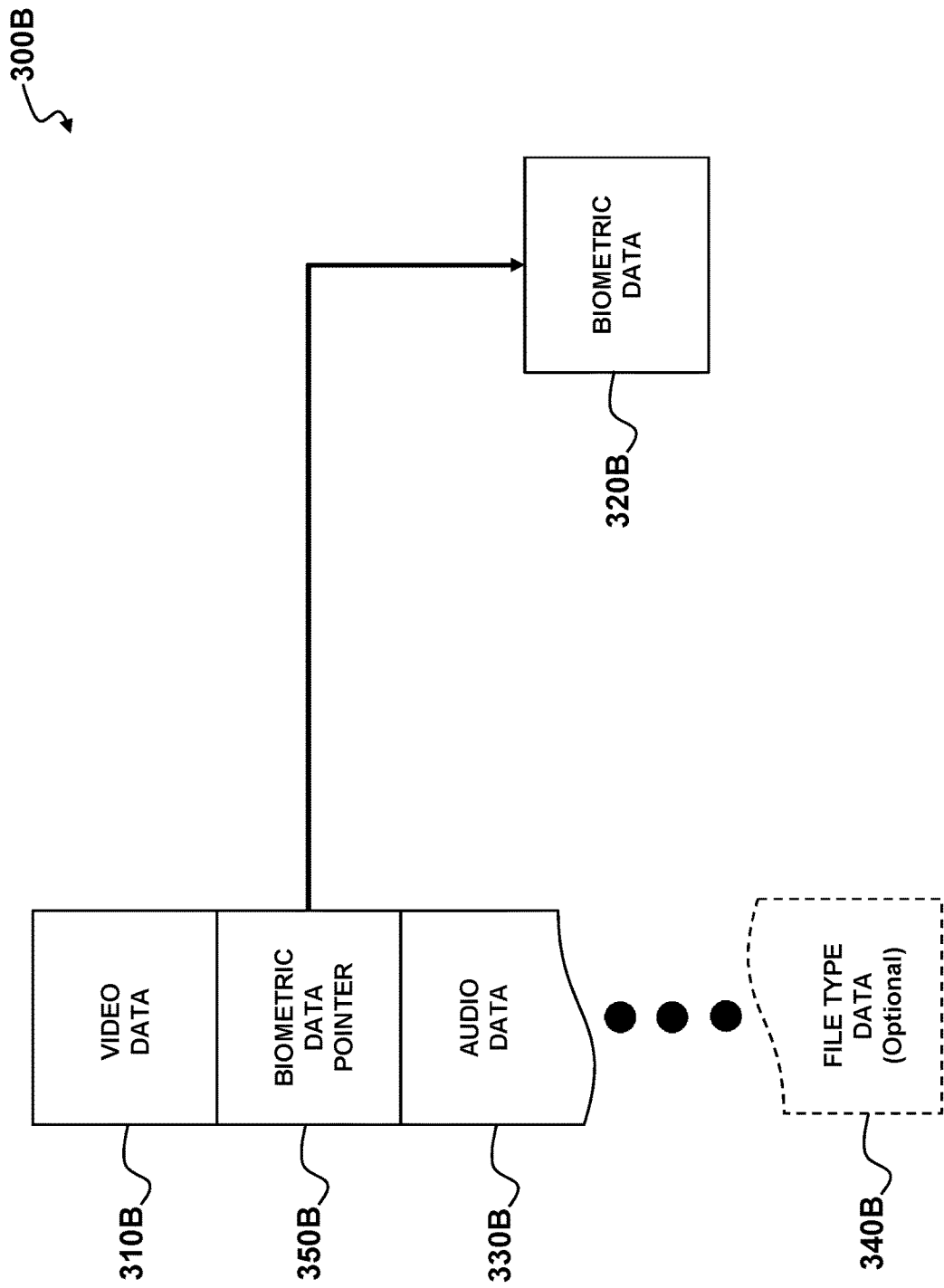
FIG. 3B conceptually illustrates a top level functional block diagram of a referential bio-media file structure in accordance with an embodiment of the invention.

Another type of bio-media file type structure in accordance with an embodiment of the invention is illustrated in FIG. 3B. In this referential bio-media data type 300B, the bio-media file may comprise video data 310B, audio data 330B, and optional file type data 340B. In some aspects of the present embodiments however, the referential bio-media file 300B comprises a biometric data pointer 350B that references the location of a separate biometric data file 320B. In a number of embodiments, the biometric data 320B may be stored locally. In other embodiments, the biometric data 320B is stored on a remote server and may have a URL as the biometric data pointer 350B. In additional embodiments, the biometric data pointer 350B is stored as metadata in the bio-media file.

While a variety of bio-media file types are described herein with reference to FIGS. 3A-B, the specific file structures utilized within a bio-media recording and playback system and the manner in which the bio-media files are digitized are largely dependent upon the requirements of specific applications. For example, in some aspects of the present embodiments, the bio-media file may be streamed by a content delivery or edge network which may split up the file into multiple pieces and deliver it as needed in real-time. Those skilled in the art will recognize that the bio-media data file will not be stored in digital memory structure in a linear fashion as depicted in FIGS. 2A-B and may be broken up and scattered in many pieces. Additionally, some embodiments may take pre-existing audio/visual media and add non-natural biometric data for increased user immersion. Distribution methods for bio-media files are discussed below.

Bio-Media Distribution

Figure 4A:
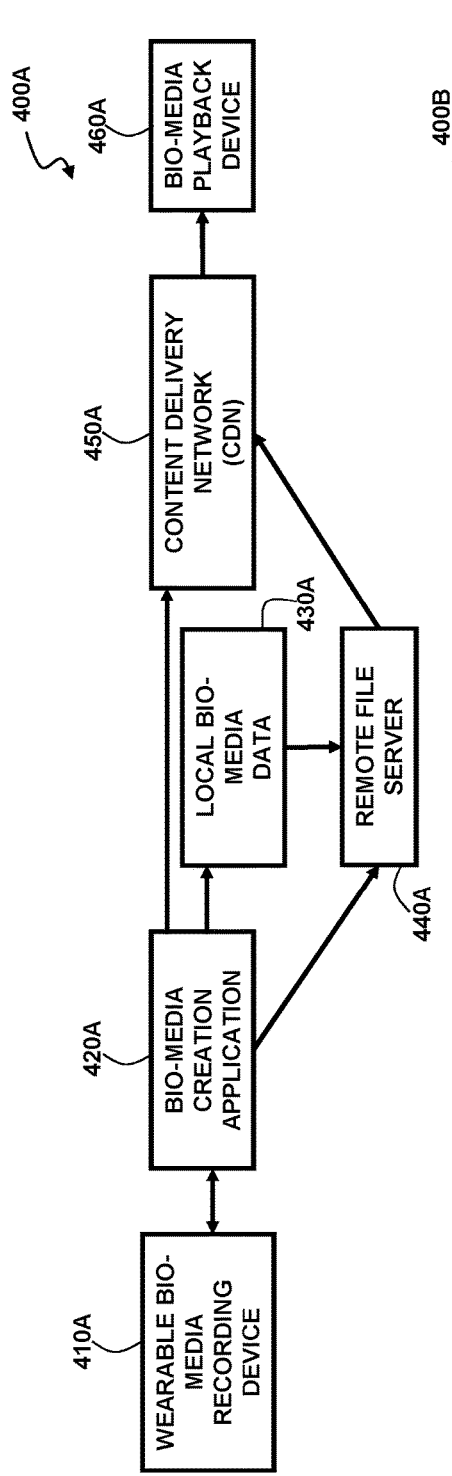
FIG. 4A is a flow chart conceptually illustrating a process for distributing recorded bio-media files in accordance with an embodiment of the invention.

A bio-media file distribution system in accordance with an embodiment of the invention is illustrated in FIG. 4A. In some aspects of the present embodiments, a user may have a wearable bio-media recording device 410A that utilizes a bio-media creation application 420A that may record biometric data and create bio-media files. In additional embodiments, the bio-media data file 430A may be stored locally on the user device 410A. In some embodiments, the bio-media file may be transmitted to a remote file server 440A which may then deliver the bio-media file to a content delivery network (CDN) 450A. In a number of embodiments, the CDN 450A or other edge delivery network transmits the bio-media file to a plurality of bio-media playback devices 460A. In numerous embodiments, the bio-media file distribution system 400A is accomplished in real-time, or near real-time with only a slight delay.

Figure 4B:
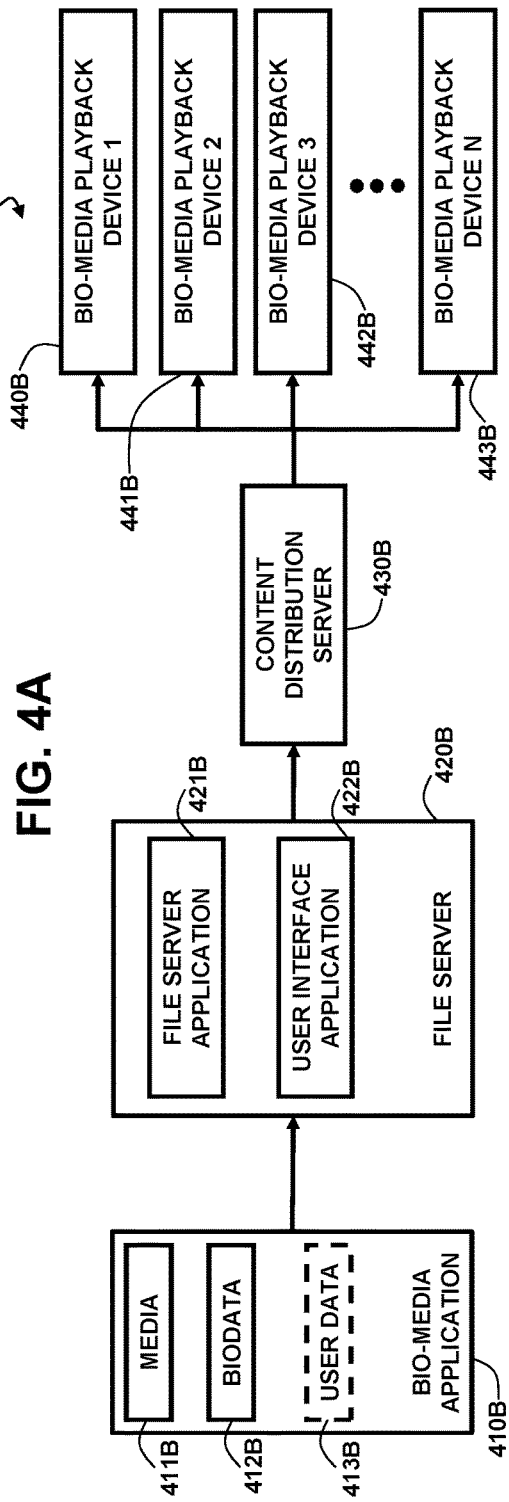
FIG. 4B is a flow chart conceptually illustrating a process for broadcasting recorded bio-media files to multiple playback devices in accordance with an embodiment of the invention.

A bio-media file broadcast system in accordance with an embodiment of the invention is illustrated in FIG. 4B. It may be beneficial to broadcast out the bio-media file of one user to many different other user's playback devices. In a number of embodiments, the bio-media file broadcast system 400B accomplishes this by first creating a bio-media file in a bio-media application 410B utilizing media 411B, biometric data 412B, and optionally other user data 413B. Once the bio-media file for broadcast is created, in some aspects of the present embodiments, the file is uploaded to a file server 420B which may itself have a file server application 421B and user interface application 422B. The file server 420B may then, in some embodiments, transmit the bio-media file to a content distribution server 430B. The content distribution server 430B may then replicate, and transmit the bio-media file to a multitude of users (440B, 441B, 442B, and 443B). Those skilled in the art will recognize that the number of bio-media playback devices that may utilize the bio-media file is only limited by the distribution technologies of the content distribution servers 430B and not the bio-media format.

While a variety of bio-media distribution systems are described above with reference to FIGS. 4A-B, the specific methods of distribution utilized within a bio-media recording and playback system and the manner in which the bio-media files are mass-delivered are largely dependent upon the requirements of specific applications. For example, in some aspects of the present embodiments, the bio-media file may be streamed by a content delivery or edge network which may split up the file into multiple pieces and deliver it as needed in real-time allowing for different channels or levels of quality for the bio-media data to arrive, based on the user's connection speed or other connectivity factors. Additionally, further embodiments may include a process where a bio-media file is created at the file server by combining and/or averaging out multiple bio-media files (and recorded biometric data) from a plurality of users to create a 'combined' bio-media file. Methods for creating and playing back bio-media files are discussed below.

Bio-Media Playback

Figure 5:
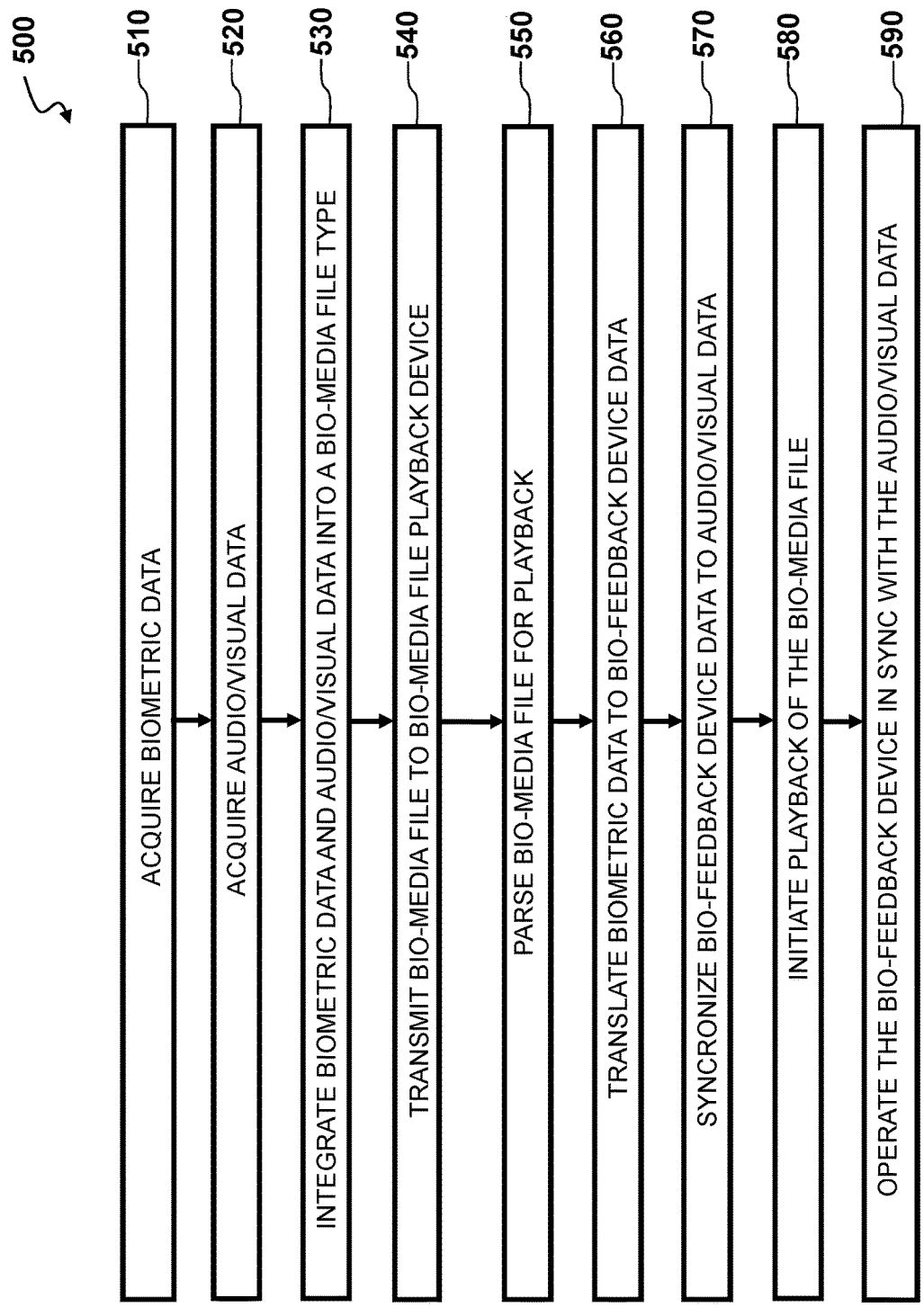
FIG. 5 is a flow chart illustrating a process for creating and playing back bio-media files in accordance with an embodiment of the invention.

A process for recording and playing back bio-media data in accordance with an embodiment of the invention is illustrated in FIG. 5. The process 500 initially acquires (510) biometric data from at least one biometric sensor. The process 500 may also, in additional embodiments, acquire (520) audio/visual data. In some aspects of the present embodiments, the audio/visual data is acquired (520) on the same device as the biometric data. In some embodiments, the biometric sensor data may have been acquired separately from the audio/visual data. Those skilled in the art will recognize that audio/visual data may encompass numerous formats and combinations including data that is absent audio and/or visual component data. The process 500 integrates (530) the biometric data and audio/visual data into a bio-media file. In still additional embodiments, the bio-media file is a single file. In other still additional embodiments, the biometric data is stored separately from the bio-media file and only referenced to by a pointer or other such method within the bio-media file. The process 500, in yet other embodiments, transmits (540) the bio-media file to a suitable bio-media playback device. The bio-media playback device may then parse (550) the bio-media file for playback. In still some aspects of the present embodiments, the parsed bio-media file utilizes data relating to the biometric information to translate (560) biometric data to bio-feedback device data.

In further embodiments, the bio-feedback device may include, but is not limited to, vibrations, lights, sounds, and/or sustained tactile feedback.

In certain additional embodiments, the process 500 synchronizes (570) the bio-feedback device data to the audio/visual data. As part of the synchronization process, the system and devices may use audio and video timing related to the bio-media data and provide relative timing of audio and video portion with bio-media during creation, transmission, reception, and play-back processing to eliminate any cause and effect issues with synching. Those skilled in the art will recognize that there are various methods to synchronize data including utilizing metadata and/or play length or marker matching. The process 500 may then initiate (580) playback of the bio-media file. In further additional embodiments, the playback includes operating (590) the bio-feedback device in sync with the audio/visual data. In still further embodiments, this operation (590) is accomplished by utilizing the bio-feedback device data. In some aspects of the present embodiments, the A/V data and bio-media synchronization for playback may be either in the form of interleaved video and audio data with bio-media or by explicit relative time-stamping of data. That is, the processing of data may use the relative data timing by, for example, stretching between or interpolation of received data. In this embodiment, the processing may eliminate any A/V bio-media sync errors, via increasing any data loss due to transmission errors and/or missing or mistimed processing. As an example, and not limitation, an A/V data playback should not lead bio-media by no more than a approximately 15 milliseconds and A/V data should lag bio-media by no more than approximately 45 milliseconds. In some embodiments, applications running on a computing device may be able to reserve network resources for improved synchronization and low-latency. According to certain embodiments, synchronizing multiple streams, e.g., A/V data stream and bio-media data stream, is needed to ensure the data streams are rendered correctly in time.

While a variety of bio-media creation and playback processes are described above with reference to FIG. 5, the specific methods of bio-media file creation and the manner in which the bio-media files are played back are largely dependent upon the requirements of specific applications. For example, in some aspects of the present embodiments, the bio-media file may be spliced together from separate, non-related biometric and audio/visual files post hoc. Devices for playing back bio-media files are discussed below.

Bio-Media Playback Devices

Figure 6A:
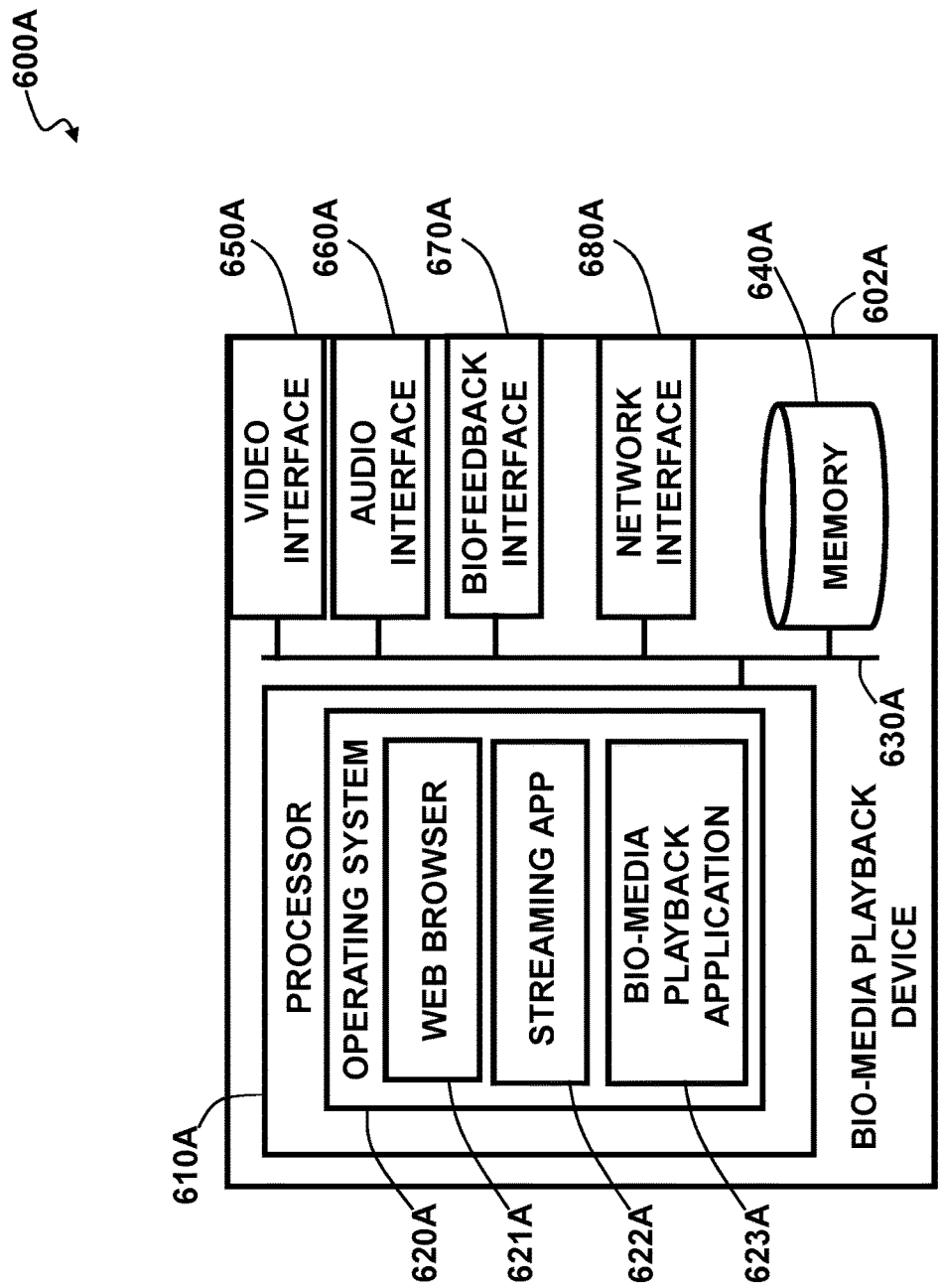
FIG. 6A conceptually illustrates a top level functional block diagram of a bio-media playback device in accordance with an embodiment of the invention.

A bio-media file distribution system 600A in accordance with an embodiment of the invention is illustrated in FIG. 6A. In some aspects of the present embodiments, the bio-media playback device 602A comprises a processor 610A and a memory 640A connected via a communication bus 630A. In some embodiments, the memory 640A may direct the processor to run an operating system 620A which may then initiate other applications such as a web browser 621A, streaming application 622A, and a bio-media playback application 623A. The processor 610A and applications (621A, 622A, and 623A) may communicate via the communication bus 630A to a video interface 650A, audio interface 660A, biometric interface 670A, and/or the network interface 680A. The biometric interface may include, but is not limited to, vibrations, haptic feedback, additional sound or light, and/or a data overlay on either or both of the video interface 650A or audio interface 660A. Those skilled in the art will recognize that there are numerous methods of displaying, communicating, or providing bio-feedback, and either a single or combination of all types may be utilized based on the applications desired. In certain embodiments it may be necessary to have specialized hardware or software to decrypt a bio-media file that is encrypted, or comprises encrypted biometric or other PHI data.

Figure 6B:
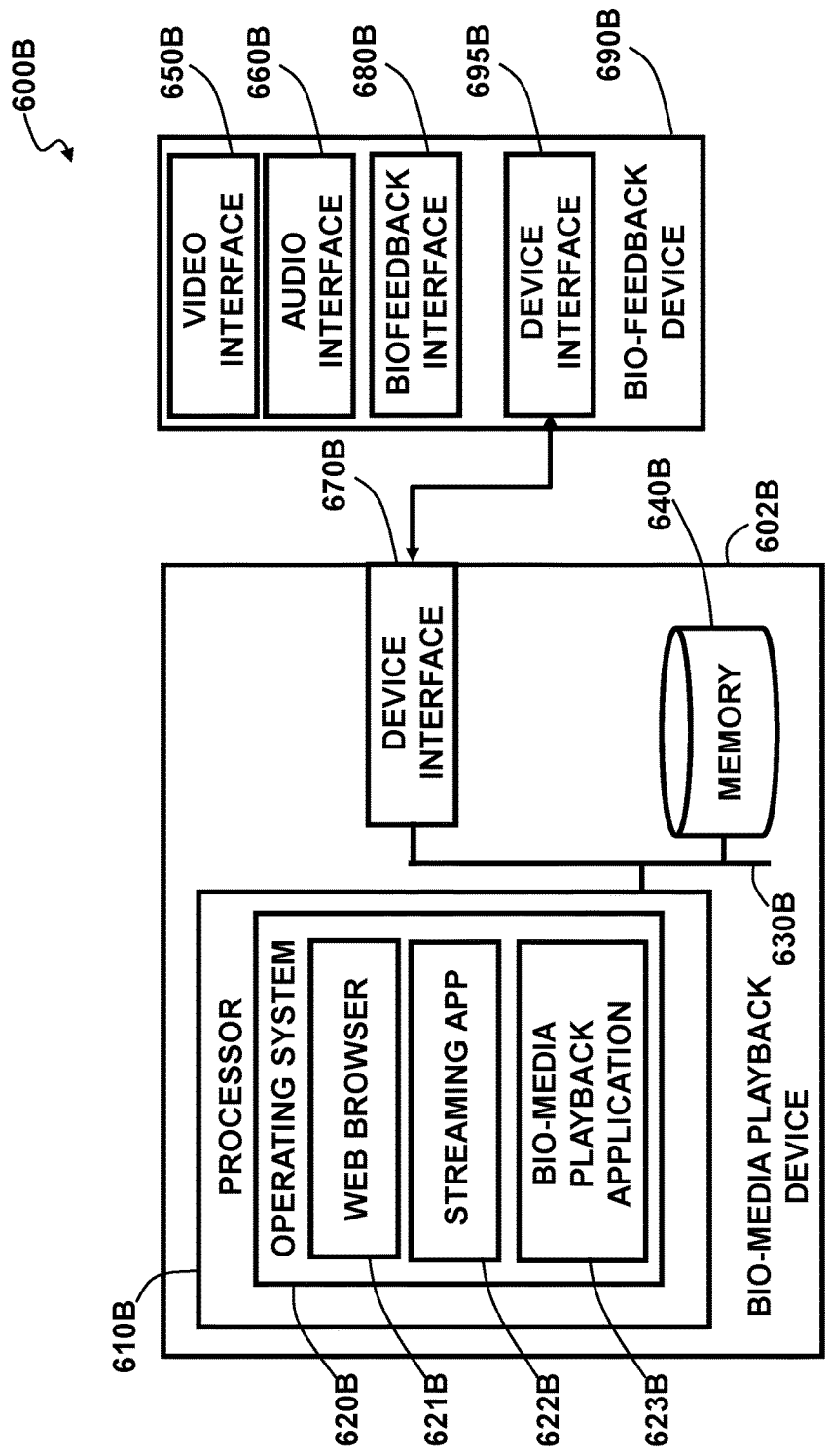
FIG. 6B conceptually illustrates a top level functional block diagram of a bio-media playback device connected to a biometric sensor device in accordance with an embodiment of the invention.

Another embodiment of a bio-media playback system in accordance with the invention is illustrated in FIG. 6B. Similar to the bio-media recording device of FIG. 6A, the bio-media playback system 600B comprises a bio-media playback device 602B that comprises a processor 610B and a memory 640B connected via a communication bus 630B. The memory 640B may direct the processor run an operating system 620B which may then initiate other applications such as a web browser 621B, streaming application 622B, and a bio-media playback application 623B. The processor 610B and applications (621B, 622B, and 623B) may communicate via the communication bus 630B to a device interface 670B. The device interface 670B may be in communication with a bio-feedback device 690B that may itself comprise a video interface 650B, audio interface 660B and bio-feedback interface 680B. In further embodiments, the bio-feedback device 690B has a device interface 695B that communicates to the device interface 670B of the bio-media playback device 602B. In still further embodiments, this interface between the bio-media playback device 602B and the bio-feedback device 690B may be wireless or through a remote setting. In some embodiments, the bio-media playback application 623B directs the bio-feedback interface 680B of the bio-feedback device 690B to initiate bio-feedback based on a parsed bio-media file. In other some embodiments, the bio-media playback application 623B streams the bio-media file to the bio-feedback device, and allows for playback on the bio-feedback device without the further need for the bio-media playback application 623B or device connection.

While a variety of bio-media playback devices are described above with reference to FIGS. 6A-B, the specific components utilized within a bio-media playback device and the manner in which the bio-media files are played back are largely dependent upon the requirements of specific applications. For example, in some embodiments, an external bio-feedback device may comprise an operating system, or memory. Those skilled in the art will recognize that bio-feedback devices may come in a variety of configurations and may be utilized based on the nature of the applications needed. Additionally, some embodiments may utilize virtual reality (VR) and/or augmented reality (AR) players/headsets to play bio-media files.

Figure 7:
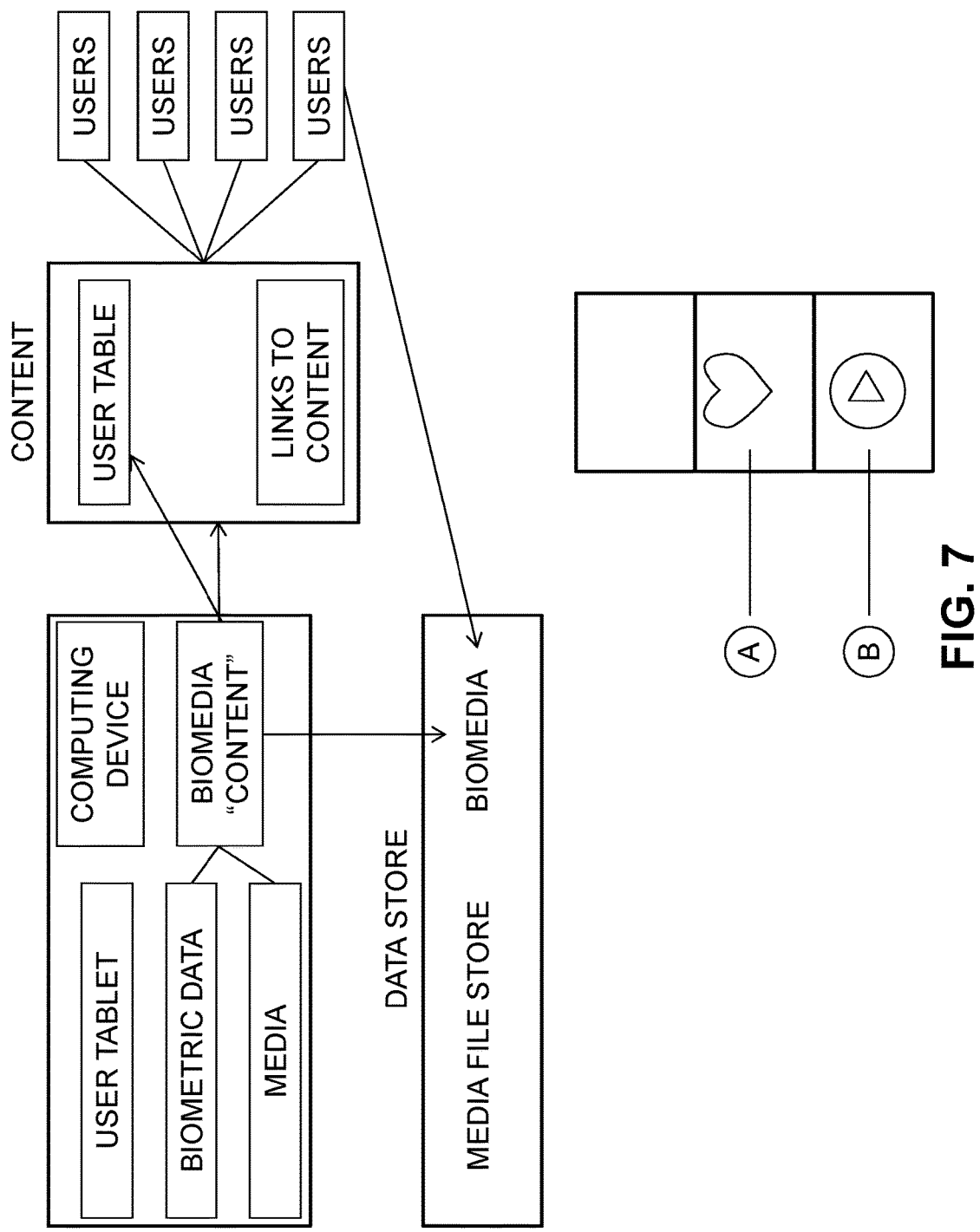
FIG. 7 depicts a functional block diagram of an example bio-media integrated data system.

FIG. 7 depicts a functional block diagram of an example bio-media integrated data system where a computing device controller may collect bio-media content from, for example, a user tablet. In one embodiment, the bio-media content may comprise biometric data and media. Optionally, the bio-media content may be stored in a data store via media file storage system that may make the bio-media readily available for access in real-time or near real-time. A content determining controller having a processor and readable memory may determine a user table based on the bio-media content, where the user table may comprise links to the content and allow for the execution of commands to access the user table. A number of users may then be able to access the user table and based on retrieving a link to the content, access the data store, i.e., media file store, and read the bio-media content previously stored or being broadcasted live.

Figure 8:
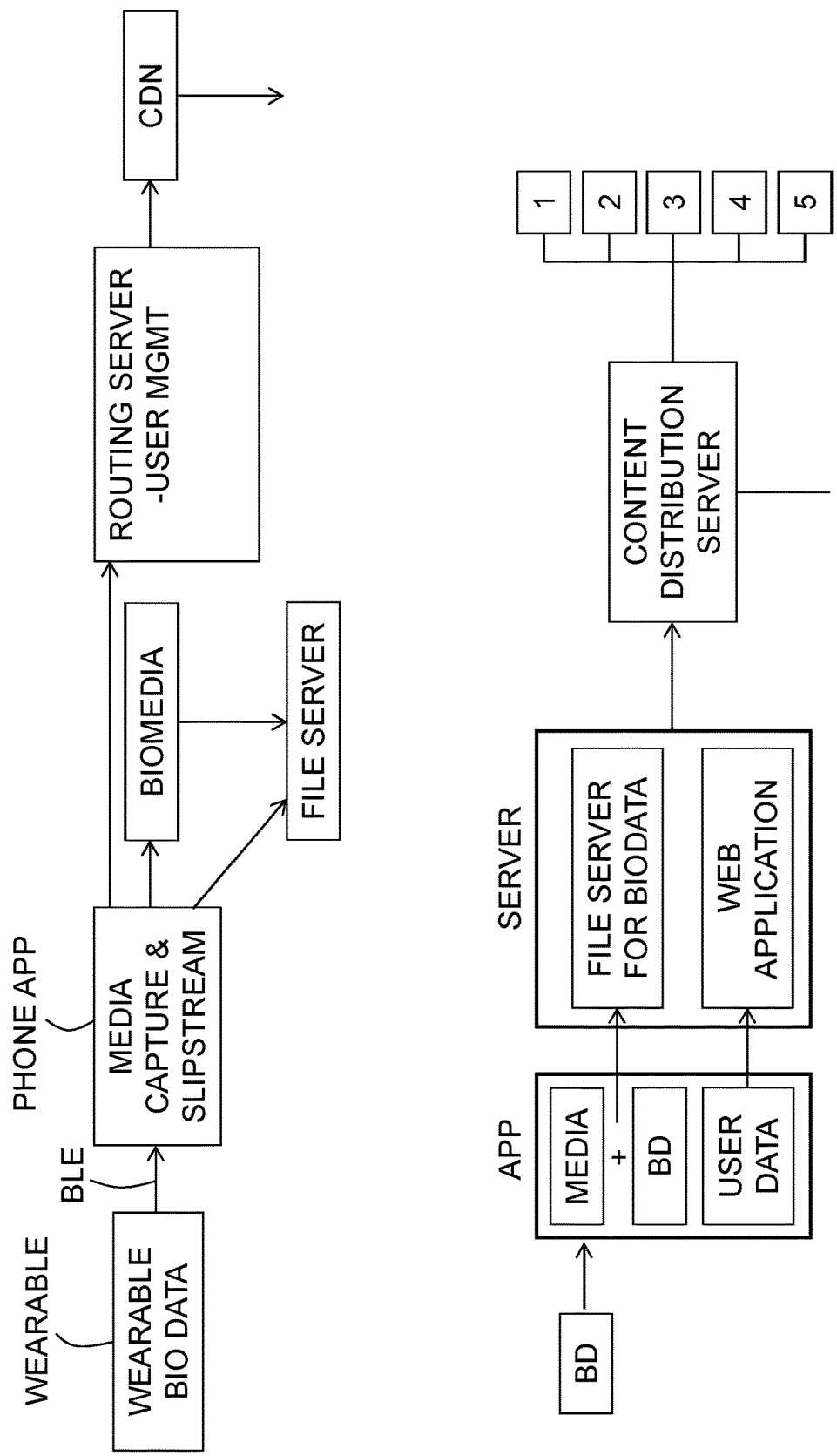
FIG. 8 depicts a functional block diagram of an example system for determining integrated bio-media data.

FIG. 8 depicts a functional block diagram of an example system for determining integrated bio-media data. In this embodiment, a wearable device, for example, watch, may be connected to a smartphone, via an example BLE method, and where an application running on the phone may capture the media and perform the slip-stream operations disclosed herein. A file server computing device may be employed so as to control access to separately stored files, as part of a multiuser system, based on bio-media data and the captured and slip-streamed media. Additionally, a routing server computing device may provide user management functionality where the received captured and slip-streamed media may be received as input. A content delivery network (CDN), for example, system of distributed servers (network) that deliver Web content to a set of users, may then receive the managed, captured and slip-streamed media, to process based on, for example, the geographic locations of the user, the origin of the webpage and a content delivery server.

FIG. 8 further depicts a communication medium between an application running on a user equipment, e.g., computing device, where media and bio-media data may be slip-streamed or integrated with other user data and transmitted to a server computing device. The server computing device may provide a file server for bio-media data and a web-application for distribution of content by a content distribution server. In some aspects of the embodiments, a precise synchronization method may be implemented where the devices within the system periodically exchange timing information that allows both ends of the link to synchronize their time base reference clock precisely or to within an acceptable levels. Accordingly, precise synchronization of the present embodiments, may allow synchronization of data streams (e.g., A/V data and bio-media data) and to provide a common time base for sampling/receiving data streams at a source device and presenting those streams at the destination device with the same relative timing. One example of implementing such a system may be by designating one of the devices as a master that provides a master timing signal and then all other devices may synchronize their clocks with the master. In one embodiment, the master device may be selected based on a set of criterion taking into account the level of sophistication of the devices within the system or by a user.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A bio-media playback device comprising:
    a processor and addressable memory;
    a video interface;
    an audio interface;
    at least one bio-feedback interface;
    wherein the memory comprises a bio-media playback application that directs the processor to:
        acquire a bio-media file, wherein the bio-media file comprises video interface output data, audio interface output data, and biometric data, and wherein the bio-media file is generated based on biometric data gathered from a set of biometric sensors of a bio-media recorder and slipstreamed with the video interface output data and audio interface output data;

translate the biometric data to bio-feedback interface data for playback, wherein the bio-feedback interface data provides instructions for playback of the biometric data parsed from the acquired bio-media file;

determine bio-media playback data via an integration of the bio-feedback interface data with at least one of:
   the video interface output data; and
   the audio interface output data;

initiate playback of the integrated bio-media playback data; and operate the bio-media playback device based on using the integrated bio-media playback data to send instruction to a set of output sensors on the bio-media playback device to replicate the biometric data gathered from the set of biometric sensors of the bio-media recorder.

2. The bio-media playback device of claim 1, wherein the bio-media playback application further directs the processor to integrate the bio-feedback interface data with the video interface output data and the audio interface output data.

3. The bio-media playback device of claim 2 wherein the integration process synchronizes the bio-feedback interface data with at least one of:
   the video interface output data; and
   the audio interface output data.

4. The bio-media playback device of claim 1, wherein the integration process is via using metadata stored within the bio-media file.

5. The bio-media playback device of claim 1, wherein the bio-media playback application further directs the processor to acquire the bio-media file from a remote server.

6. The bio-media playback device of claim 1, wherein the playback of the bio-media file is achieved in real-time.

7. The bio-media playback device of claim 1, wherein the bio-media playback application further directs the processor to acquire the bio-media file as a data stream from a broadcast provider.

8. The bio-media playback device of claim 7, wherein the data stream is a bio-media file with bio-feedback interface data representing a combined biometric value determined from at least two bio-media files.

9. The bio-media playback device of claim 1, wherein the acquired bio-media file comprises:
   a video interface output data;
   an audio interface output data; and
   a referential pointer data to bio-feedback interface data, wherein the bio-feedback interface data is stored external to the bio-media file.

10. The bio-media playback device of claim 9, wherein the referential pointer data to bio-feedback interface data references bio-feedback interface data stored on a remote server.

11. A method for playback of bio-media files, the method comprising:

acquiring a bio-media file, wherein the bio-media file comprises video interface output data, audio interface output data, and biometric data, and wherein the bio-media file is generated based on biometric data gathered from a set of biometric sensors of a bio-media recorder and slipstreamed with the video interface output data and audio interface output data;

translating the biometric data to bio-feedback interface data, wherein the bio-feedback interface data provides instructions for playback of the biometric data parsed from the acquired bio-media file;

determining bio-media playback data via an integration of the bio-feedback interface data with at least one of:
   the video interface output data; and
   the audio interface output data;

initiating playback of the integrated bio-media playback data; and operating the bio-media playback device based on using the integrated bio-media playback data to send instruction to a set of output sensors on the bio-media playback device to replicate the biometric data gathered from the set of biometric sensors of the bio-media recorder.

12. The method of claim 11 further comprising: integrating the at least one-bio-feedback interface data with the video interface output data and the audio interface output data.

13. The method of claim 12 wherein the integration synchronizes the bio-feedback interface data with at least one of:
   the video interface output data; and
   the audio interface output data.

14. The method of claim 11, wherein the integration is via using metadata stored within the bio-media file.

15. The method of claim 11, wherein the process further comprises acquiring the bio-media file from a remote server.

16. The method of claim 11, wherein playback of the bio-media file is achieved in real-time.

17. The method of claim 11, wherein the process further comprises acquiring the bio-media file as a data stream from a broadcast provider.

18. The method of claim 17, wherein the data stream is a bio-media file with bio-feedback interface data representing a combined biometric value determined from at least two bio-media files.

19. The method of claim 11, wherein the acquired bio-media file comprises:
   a video interface output data;
   an audio interface output data; and
   a referential pointer data to bio-feedback interface data, wherein the bio-feedback interface data is stored external to the bio-media file.

20. The method of claim 19, wherein the referential pointer data to bio-feedback interface data references bio-feedback interface data stored on a remote server.

* * * * *